US011988230B2

(12) United States Patent
Ito et al.

(10) Patent No.: US 11,988,230 B2
(45) Date of Patent: May 21, 2024

(54) TURBO MACHINE WITH VIBRATION REDUCTION DEVICE FOR STATOR VANES

(71) Applicant: HONDA MOTOR CO., LTD., Tokyo (JP)

(72) Inventors: Ken Ito, Saitama (JP); Yuta Ito, Saitama (JP); Daiki Hama, Saitama (JP); Shu Taguchi, Saitama (JP); Tatsuro Akasaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/058,367

(22) Filed: Nov. 23, 2022

(65) Prior Publication Data

US 2023/0204049 A1 Jun. 29, 2023

(30) Foreign Application Priority Data

Dec. 27, 2021 (JP) ................................ 2021-212090

(51) Int. Cl.
*F04D 29/66* (2006.01)
*F04D 29/54* (2006.01)

(52) U.S. Cl.
CPC ......... *F04D 29/668* (2013.01); *F04D 29/541* (2013.01); *F05D 2220/32* (2013.01); *F05D 2240/12* (2013.01); *F05D 2260/38* (2013.01); *F05D 2260/96* (2013.01)

(58) Field of Classification Search
CPC ...... F04D 29/541; F04D 29/66; F04D 29/661; F04D 29/668; F05D 2220/32; F05D 2240/12; F05D 2260/38; F05D 2260/96; F01D 9/00; F01D 9/02; F01D 9/04; F01D 9/041; F01D 9/042; F01D 25/04; F01D 25/06
See application file for complete search history.

(56) References Cited

U.S. PATENT DOCUMENTS

| | | | | | |
|---|---|---|---|---|---|
| 5,494,404 | A * | 2/1996 | Furseth | F01D 9/042 415/209.3 |
| 7,291,946 | B2 | 11/2007 | Clouse et al. | |
| 8,147,191 | B2 | 4/2012 | Baumhauer et al. | |
| 2012/0251313 | A1* | 10/2012 | Eleftheriou | F01D 21/045 415/209.3 |
| 2014/0241874 | A1* | 8/2014 | Rioux | F01D 9/042 29/889.21 |
| 2016/0312800 | A1* | 10/2016 | Leslie | F01D 25/06 |
| 2017/0211592 | A1* | 7/2017 | Klauke | F01D 5/10 |

FOREIGN PATENT DOCUMENTS

| | | | |
|---|---|---|---|
| EP | 1441108 | A2 | 7/2004 |
| JP | 5035138 | B2 | 9/2012 |

* cited by examiner

*Primary Examiner* — Elton K Wong
(74) *Attorney, Agent, or Firm* — Armstrong Teasdale LLP

(57) ABSTRACT

Provided is a vibration reduction device for stator vanes (30) positioned behind rotor blades (28) in a turbo machine, comprising an annular base member (80) having a cylindrical shape concentric around a central axis of the casing and supporting base ends of the stator vanes which extend radially inward from an inner circumferential surface of the base member, an elastomeric damping member (100) surrounding and in slidable contact with an outer circumferential surface of the base member, and a preloading member (102) surrounding an outer circumferential surface of the elastomeric damping member and configured to apply a preload directed radially inward to the elastomeric damping member.

6 Claims, 5 Drawing Sheets

TURBO MACHINE WITH VIBRATION REDUCTION DEVICE FOR STATOR VANES

TECHNICAL FIELD

The present invention relates to a vibration reduction device for stator vanes of a turbo machine such as a gas turbine engine.

BACKGROUND ART

A turbo machine such as a compressor of a gas turbine engine typically includes a rotating shaft rotatably supported by a casing, a plurality of rows of rotor blades fixedly attached to the rotating shaft, and a plurality of rows of stator vanes fixedly attached to the casing so as to alternate with the rows of the rotating blades along the length of the rotating shaft. The stator vanes convert velocity into pressure so as to increase the overall efficiency of the compressor.

The stator vanes are subjected to cyclic forces due to the fluctuating pressure exerted by the air flow. It is known that the stator vanes may vibrate to an excessive extent depending on the operating condition of the compressor.

To overcome this problem, EP1441108A2 (U.S. Pat. No. 7,291,946B2) proposes a damper to be installed at the free end (radially inner end) of the stator vanes. The damper includes a bent piece of sheet metal resiliently interposed between an annular platform connected to the base ends of the stator vanes and an annular air seal retained by the platform. When the stator vanes vibrate, frictional force is created between the bent piece and the platform so as to provide a damping action. JP5035138B2 (U.S. Pat. No. 8,147,191B2) proposes the use of layers of viscoelastic material attached to the outer circumferential surface of an outer ring member from which stator vanes extend radially inward. The layers of viscoelastic material provide a damping action against the vibration of the stator vanes.

However, these prior art technologies still leave much to be desired in terms of effectiveness of vibration reduction, and ease of installation.

SUMMARY OF THE INVENTION

In view of such a problem of the prior art, a primary object of the present invention is to provide a vibration reduction device for stator vanes of a turbo machine which is more effective and easier to install as compared to the prior art.

To achieve such an object, the present invention provides a vibration reduction device for stator vanes (30) positioned behind rotor blades (28) in a turbo machine, comprising: an annular base member (80) having a cylindrical shape concentric around a central axis of a casing of the turbo machine and supporting base ends of the stator vanes which extend radially inward from an inner circumferential surface of the base member; an elastomeric damping member (100) surrounding and in slidable contact with an outer circumferential surface of the base member; and a preloading member (102) surrounding an outer circumferential surface of the elastomeric damping member and configured to apply a preload directed radially inward to the elastomeric damping member.

The preloading of the elastomeric damping member allows the elastomeric damping member to demonstrate an improved damping effect owing to the frictional resistance created between the elastomeric damping member and the base member as a result of the relative movement that can occur therebetween when the state vanes vibrate.

Preferably, the elastomeric damping member consists of a tubular member which is whole or segmented along a circumferential direction. Thereby, the entire base member supporting the stator vanes can be dampened so that the vibration of the stator vanes can be effectively reduced.

Preferably, the preloading member includes a cylindrical member (103) circumferentially surrounding the elastomeric damping member.

Thereby, the preloading member which may be press fitted onto the elastomeric damping member can apply a preload to the elastomeric damping member in a stable manner so that the damping action of the elastomeric damping member can be effectively improved.

Preferably, the preloading member further includes a band member (110) surrounding the cylindrical member, and a fastener (112) configured to pull two ends of the band member toward each other and apply tension to the band member.

Thereby, a desired preload can be applied to the elastomeric damping member via the cylindrical member with ease and by using a simple arrangement.

Preferably, the vibration reduction device further comprises an annular housing member (90) that is supported by a casing of the turbo machine and coaxially surrounds the base member so as to define an annular chamber (96) between an outer circumferential surface of the base member and an inner circumferential surface of the housing member, the housing member supporting a reaction of the preloading member when a preload is applied to the elastomeric damping member by the preloading member.

Thereby, a preload can be applied to the elastomeric damping member in a reliable manner by using a simple structure.

Preferably, the vibration reduction device further comprises a spring member interposed between an outer circumferential surface of the preloading member and the inner circumferential surface of the housing member.

Thereby, a preload can be applied to the elastomeric damping member in a reliable and accurate manner.

Preferably, the housing member is joined to the annular body at both axial ends thereof via respective seal members (92, 94).

Thereby, the annular chamber defined between the housing member and the base member is sealed from outside so that the elastomeric damping member positioned therein is protected from external influences, and the durability thereof can be improved. The seal members which may be made of elastomeric material also contribute to the damping of the vibration of the stator vanes.

The present invention thus provides a vibration reduction device for stator vanes of a turbo machine which is more effective and easier to install as compared to the prior art.

DESCRIPTION OF THE PREFERRED EMBODIMENT(S)

A vibration reduction device for stator vanes of a gas turbine engine according to an embodiment of the present invention will be described in the following with reference to the appended drawings.

Figure 1:
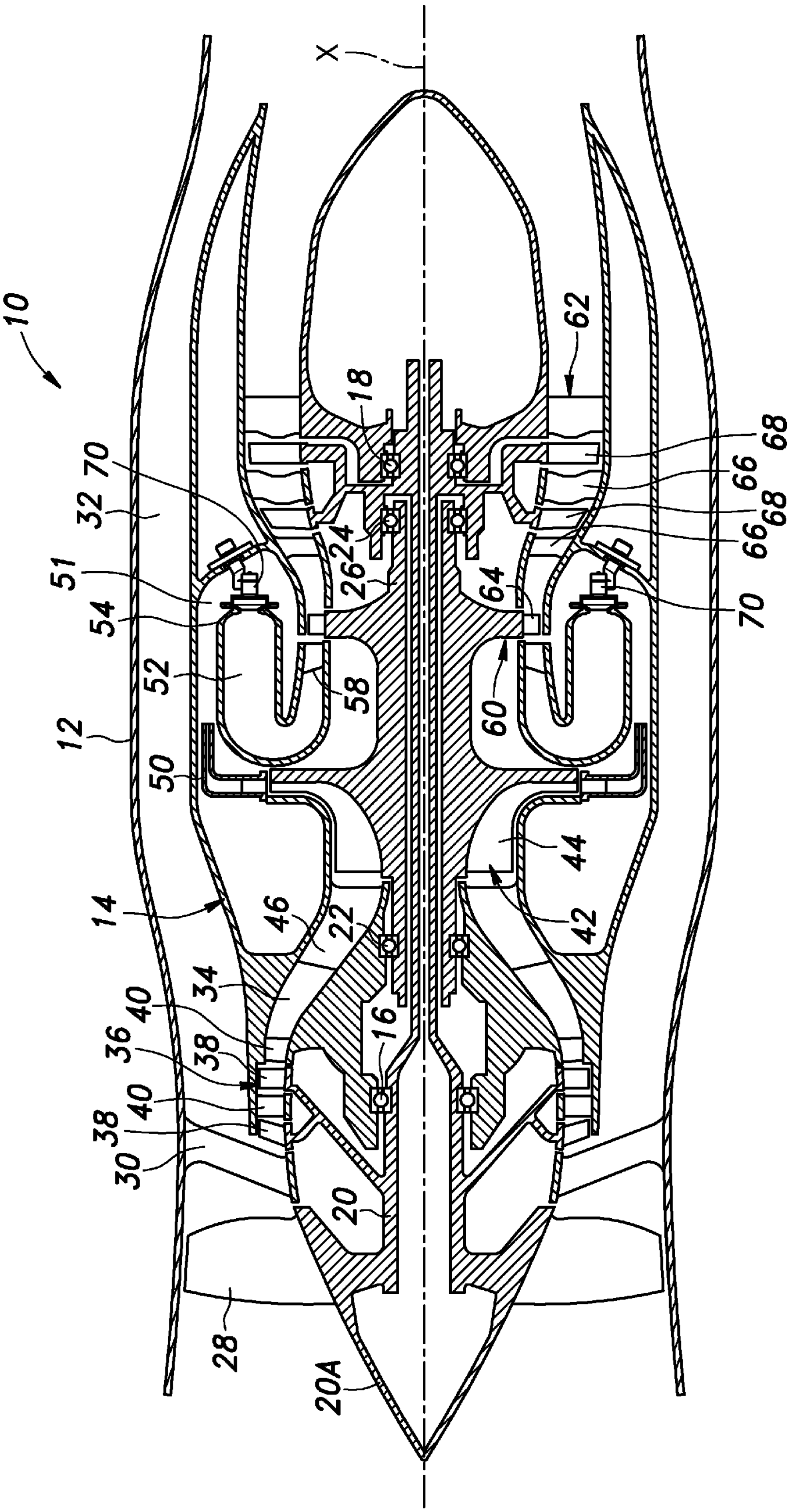
FIG. 1 is a sectional view of a gas turbine engine for aircraft provided with a vibration reduction device according to the present invention.

FIG. 1 shows a gas turbine engine 10 for aircraft to which the vibration reduction device of the present invention is applied. First, an outline of the gas turbine engine 10 will be described in the following with reference to FIG. 1.

The gas turbine engine 10 has an outer casing 12 and an inner casing 14 both cylindrical in shape and disposed coaxially to each other about a common central axis i. A low-pressure rotary shaft 20 is rotatably supported by the inner casing 14 via a front first bearing 16 and a rear first bearing 18. A high-pressure rotary shaft 26 consisting of a hollow shaft coaxially surrounds the low-pressure rotary shaft 20 about the common central axis X, and is rotatably supported by the inner casing 14 and the low-pressure rotary shaft 20 via a front second bearing 22 and a rear second bearing 24, respectively.

The low-pressure rotary shaft 20 includes a substantially conical tip portion 20A protruding forward from the inner casing 14. A front fan 28 including a plurality of front fan blades is provided on the outer periphery of the tip portion 20A along the circumferential direction. A plurality of stator vanes 30 are arranged on the outer casing 12 on the downstream side of the front fan 28 at regular intervals along the circumferential direction.

Downstream of the stator vanes 30, a bypass duct 32 having an annular cross-sectional shape is defined between the outer casing 12 and the inner casing 14 coaxially with the central axis X. An air compression duct 34 having an annular cross-sectional shape is defined centrally in the inner casing 14.

An axial-flow compressor 36 is provided at the inlet end of the air compression duct 34. The axial-flow compressor 36 includes a pair of rotor blade rows 38 provided on the outer periphery of the low-pressure rotary shaft 20 and a pair of stator vane rows 40 provided on the inner casing 14 in an alternating relationship in the axial direction.

An outlet of the air compression duct 34 is provided with a centrifugal compressor 42 which includes an impeller 44 fitted on the outer periphery of the high-pressure rotary shaft 26. At the outlet end of the air compression duct 34 or the upstream end of the impeller 44, a plurality of struts 46 extend radially in the inner casing 14 across the air compression duct 34. A diffuser 50 is provided at the outlet of the centrifugal compressor 42, and is fixed to the inner casing 14.

The downstream end of the diffuser 50 is provided with a combustor 54 for combusting the fuel therein. The combustor 54 includes an annular combustion chamber 52 centered around the central axis X. The compressed air supplied by the diffuser 50 is forwarded to the combustion chamber 52 via a compressed air chamber 51 defined between the outlet end of the diffuser 50 and the combustion chamber 52.

A plurality of fuel injection nozzles 70 for injecting liquid fuel into the combustion chamber 52 are attached to the inner casing 14 at regular intervals along the circumferential direction around the central axis X. Each fuel injection nozzle 70 injects liquid fuel into the combustion chamber 52. In the combustion chamber 52, high-temperature combustion gas is generated by combustion of a mixture of the liquid fuel injected from the liquid fuel injection nozzle 70 and the compressed air supplied from the compressed air chamber 51.

A high-pressure turbine 60 and a low-pressure turbine 62 are provided on the downstream side of the combustion chamber 52. The high-pressure turbine 60 includes a stator vane row 58 fixed to the outlet end of the combustion chamber 52 which is directed rearward, and a rotor blade row 64 fixed to the outer periphery of the high-pressure rotary shaft 26 on the downstream side of the stator vane row 58.

The low-pressure turbine 62 is located on the downstream side of the high-pressure turbine 60, and includes a plurality of stator vane rows 66 fixed to the inner casing 14 and a plurality of rotor blade rows 68 provided on the outer periphery of the low-pressure rotary shaft 20 so as to alternate with the stator vane rows 66 along the axial direction.

When the gas turbine engine 10 is started, the high-pressure rotary shaft 26 is rotationally driven by a starter motor (not shown). When the high-pressure rotary shaft 26 is rotationally driven, compressed air compressed by the centrifugal compressor 42 is supplied to the combustion chamber 52, and the air-liquid fuel mixture burns in the combustion chamber 52 to generate combustion gas. The combustion gas is impinged upon the blades of the rotor blade rows 64 and 68 to rotate the high-pressure rotary shaft 26 and the low-pressure rotary shaft 20. As a result, the front fan 28 rotates, and the axial-flow compressor 36 and the centrifugal compressor 42 are operated, so that compressed air is supplied to the combustion chamber 52, and the gas turbine engine 10 continues to operate even after the starter motor is disengaged.

Further, a part of the air drawn by the front fan 28 during the operation of the gas turbine engine 10 passes through the bypass duct 32 and is ejected to the rear to generate additional thrust. The rest of the air drawn by the front fan 28 is supplied to the combustion chamber 52, and forms a part of fuel mixture jointly with the liquid fuel. The combustion gas generated by the combustion of the mixture drives the low-pressure rotary shaft 20 and the high-pressure rotary shaft 26, and then is ejected rearward to generate a large part of the thrust provided by this gas turbine engine 10.

Figure 2:
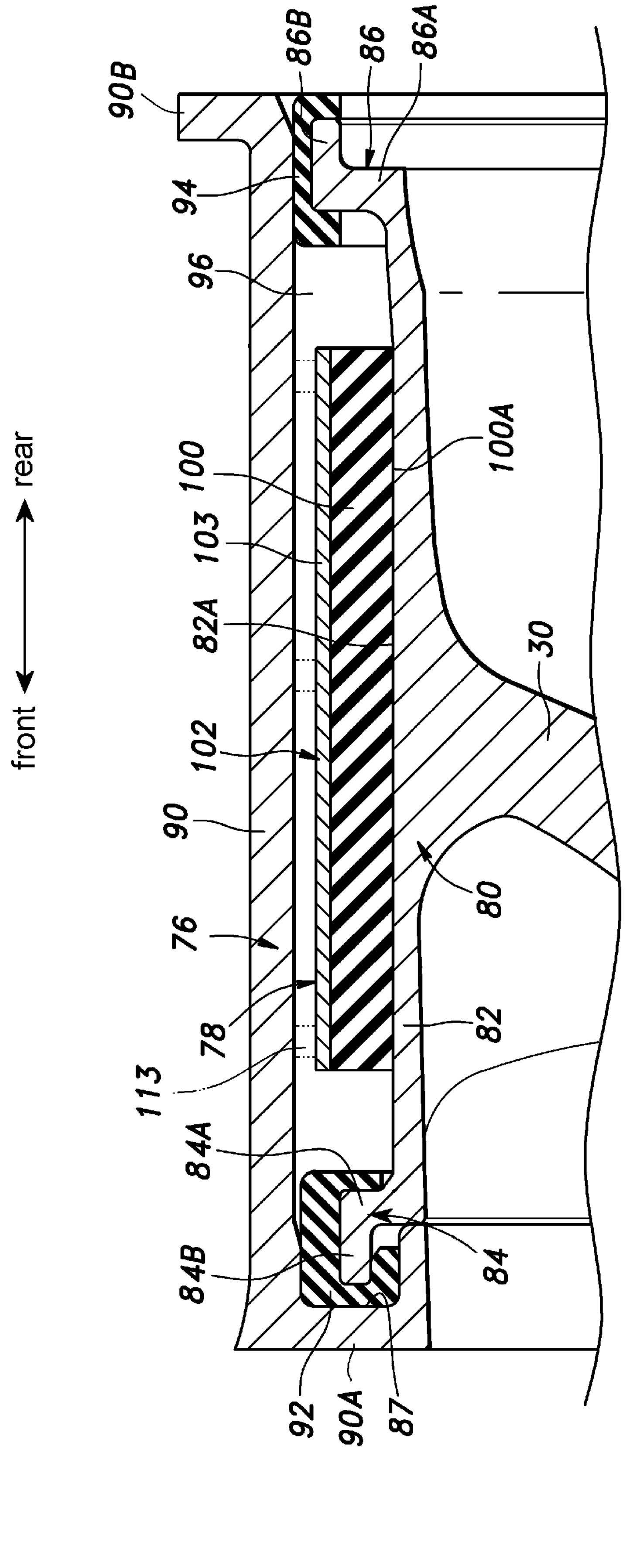
FIG. 2 is a fragmentary sectional view of a vibration reduction device according to a first embodiment of the present invention.

FIG. 2 shows a fragmentary sectional view of a part of FIG. 1 indicated by a circle A where a vibration reduction device 78 according to a first embodiment of the present invention is applied.

In FIG. 2, the base end part (radially outer end part) of one of the stator vanes 30 is connected to an annular base member 80 having a cylindrical shape and integrally formed with the base end of the stator vane 30. An annular housing member 90 is fixedly provided on the side of the inner casing 14, and forms a support portion 76 for supporting the base end of the stator vane 30 to the inner casing 14 jointly with the base member 80.

The base member 80 includes a cylindrical main body (centered around the central axis X) defining a cylindrical outer circumferential surface 82A, and a pair of hooked portions 84 and 86 at either axial end thereof. The front hooked portion 84 includes a radial flange 84A extending radially outward from the front edge of the main body of the base member 80, and an axial flange 84B extending axially forward from the radially outer edge of the radial flange 84A. The rear hooked portion 86 includes a radial flange 86A extending radially outward from the rear edge of the main body of the base member 80, and an axial flange 86B extending axially rearward from the radially outer edge of the radial flange 86A.

The front end of the housing member 90 is provided with a channel portion 90A defining a channel or a groove 87 facing rearward, and the rear end of the housing member 90 is provided with a flange 90B extending radially outward. The axial flange 84B of the front hooked portion 84 is received in the groove 87, and the axial flange 86B of the rear hooked portion 86 is retained to the housing member 90 by a retaining member not shown in the drawings. An elastomeric seal member 92 is wrapped around the axial flange 84B, and provides a seal between the housing member 90 and the base member 80 at the front end of the housing member 90. Another elastomeric seal member 94 is wrapped around the axial flange 86B, and provides a seal between the housing member 90 and the base member 80 at the rear end of the housing member 90. Thus, an enclosed annular chamber 96 is defined between the housing member 90 and the base member 80. These elastomeric seal members 92 and 94 additionally provide a cushioning action between the housing member 90 and the base member 80.

The vibration reduction device 78 includes an elastomeric damping member 100 and a preloading member 102 positioned in the enclosed annular chamber 96.

The elastomeric damping member 100 is made of an elastomer such as synthetic rubber and formed in a cylindrical shape, and is in direct contact with the outer circumferential surface 82A of the cylindrical portion 82 at an inner circumferential surface 100A thereof. Since there is no adhesive agent intervening between the elastomeric damping member 100 and the cylindrical portion 82, the elastomeric damping member 100 is slidable relative to the cylindrical portion 82 so as to provide both a frictional damping and a viscoelastic damping to the vibrations of the cylindrical portion 82 (and hence to vibrations of the stator vanes 30).

The preloading member 102 includes a cylindrical member 103 made of sheet metal of a relatively small thickness, and having a seamless structure (formed by laser welding or the like). The cylindrical member 103 surrounds the elastomeric damping member 100, and preloads the elastomeric damping member 100 radially inward. More specifically, the inner diameter of the cylindrical member 103 is slightly smaller than the outer diameter of the elastomeric damping member 100 as fitted on the cylindrical portion 82 without otherwise applying any force thereto. The cylindrical member 103 may be fitted onto the elastomeric damping member 100 by using a suitable jig, and forcing the cylindrical member 103 onto the outer circumferential surface of the elastomeric damping member 100 along the axial direction. To enable this procedure, the diameter of the outer periphery of the axial flange 84B is slightly smaller than the outer diameter of the elastomeric damping member 100.

Thus, the elastomeric damping member 100 is radially compressed between the cylindrical member 103 and the outer circumferential surface of the cylindrical portion 82. In particular, the elastomeric damping member 100 is pressed against the outer circumferential surface of the cylindrical portion 82 with a certain preload.

As a result, when the cylindrical portion 82 (the stator vanes 30) vibrates, a relative displacement occurs between the inner circumferential surface 100A of the elastomeric damping member 100 and the outer circumferential surface 82A of the cylindrical portion 82 along the interface therebetween. Owing to the preloading exerted by the cylindrical member 103, the elastomeric damping member 100 is pressed against the outer circumferential surface of the cylindrical portion 82 so that a large frictional force is created between the elastomeric damping member 100 and the cylindrical portion 82. This contributes to the damping of the vibration of the cylindrical portion 82, and combined with the viscoelastic damping action of the elastomeric damping member 100, the vibration of the cylindrical portion 82 (the stator vanes 30) can be effectively reduced.

The vibration reduction device 78 may also serve as a dynamic damper by properly selecting the mass of the cylindrical member 103 and the elastic modulus of the elastomeric damping member 100. This may further contribute to the reduction of the vibration of the cylindrical portion 82 (the stator vanes 30).

The vibration reduction device 78 is separated from the combustor 54 and the turbines 60 and 62 by the axial-flow compressor 36 and the centrifugal compressor 42 so that the elastomeric damping member 100 and other components of the vibration reduction device 78 are protected from heat. Furthermore, since the vibration reduction device 78 is constantly cooled by the intake air create by the front fan 28, the vibration reduction device 78 is well protected from heat. Further, the elastomeric damping member 100 is protected from external influences by the seal members 92 and 94 so that the durability thereof can be improved.

Figure 3:
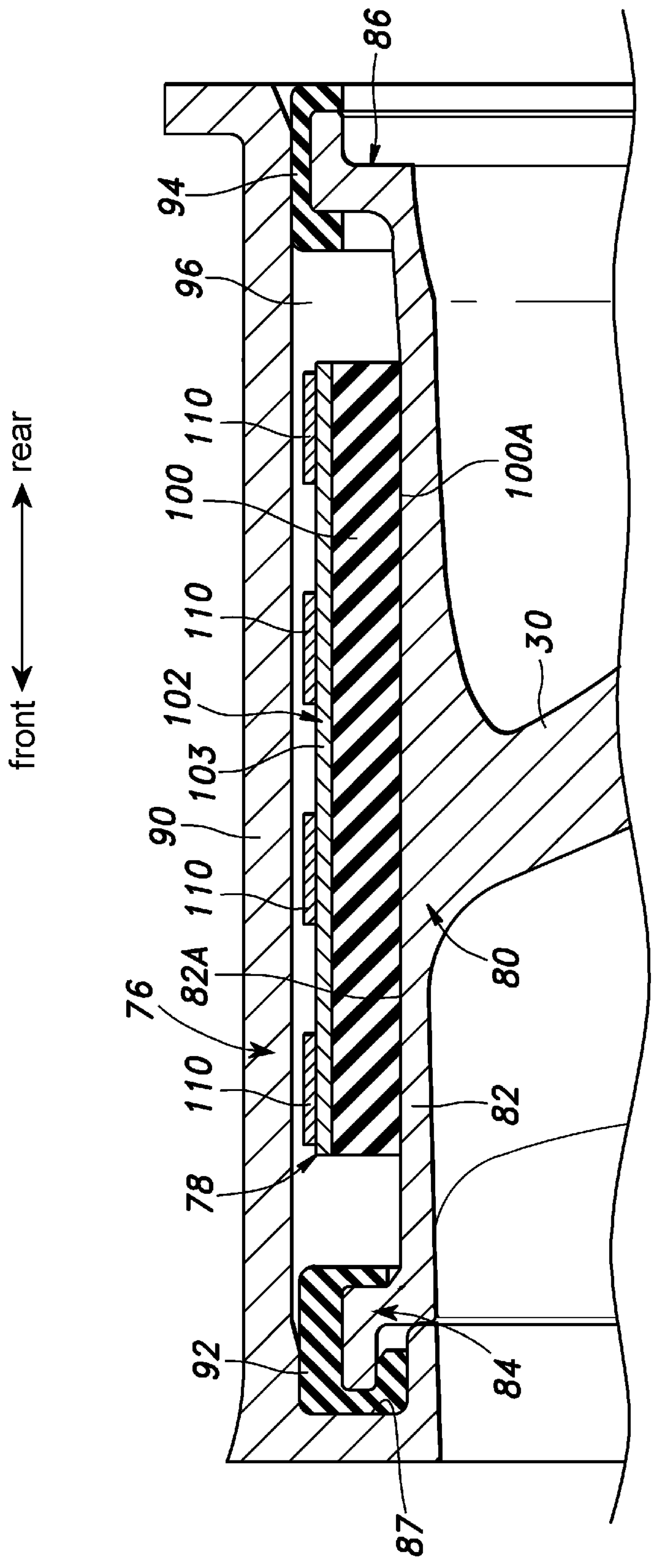
FIG. 3 is a view similar to FIG. 2 showing a vibration reduction device according to a second embodiment of the present invention.
Figure 4:
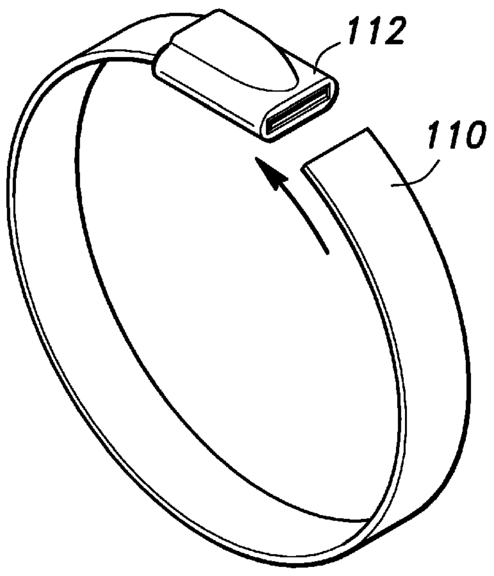
FIG. 4 is a perspective view of a band member fitted with a fastener employed in the vibration reduction device of the second embodiment.

A vibration reduction device 78 according to a second embodiment of the present invention will be described in the following with reference to FIGS. 3 and 4. The parts shown in these drawings are denoted with like numerals to the corresponding parts shown in FIG. 1, and description of such parts may be omitted in the following description to avoid redundancy.

In the second embodiment, the preloading member 102 includes a cylindrical member 103 closely surrounding an elastomeric damping member 100, and a plurality of metal bands 110 surrounding the cylindrical member 103. Each metal band 110 is provided with a fastener 112 at one end thereof, and the other end of the metal band 110 is passed into an opening in the fastener 112. The metal band 110 is placed under tension by using a suitable tool not shown in the drawings, and the fastener 112 is fastened thereon by crimping or any other mode of securement. A plurality of such metal bands 110 are placed around the cylindrical member 103 in an axially spaced apart relationship. Thus, the metal bands 110 apply a compressive load on the elastomeric damping member 100 via the cylindrical member 103 by acting like hoops of a barrel. By suitably selecting the tension of the metal bands 110 when the fasteners 112 are fastened, a desired compressive load can be applied to the elastomeric damping member 100.

In the second embodiment also, by applying a radially inward preload to the elastomeric damping member 100, the same actions and effects as those of the first embodiment can be obtained. In the second embodiment, installing of the preloading member 102 may be facilitated as compared with the case where the preload is applied by press fitting as in the first embodiment.

Figure 5:
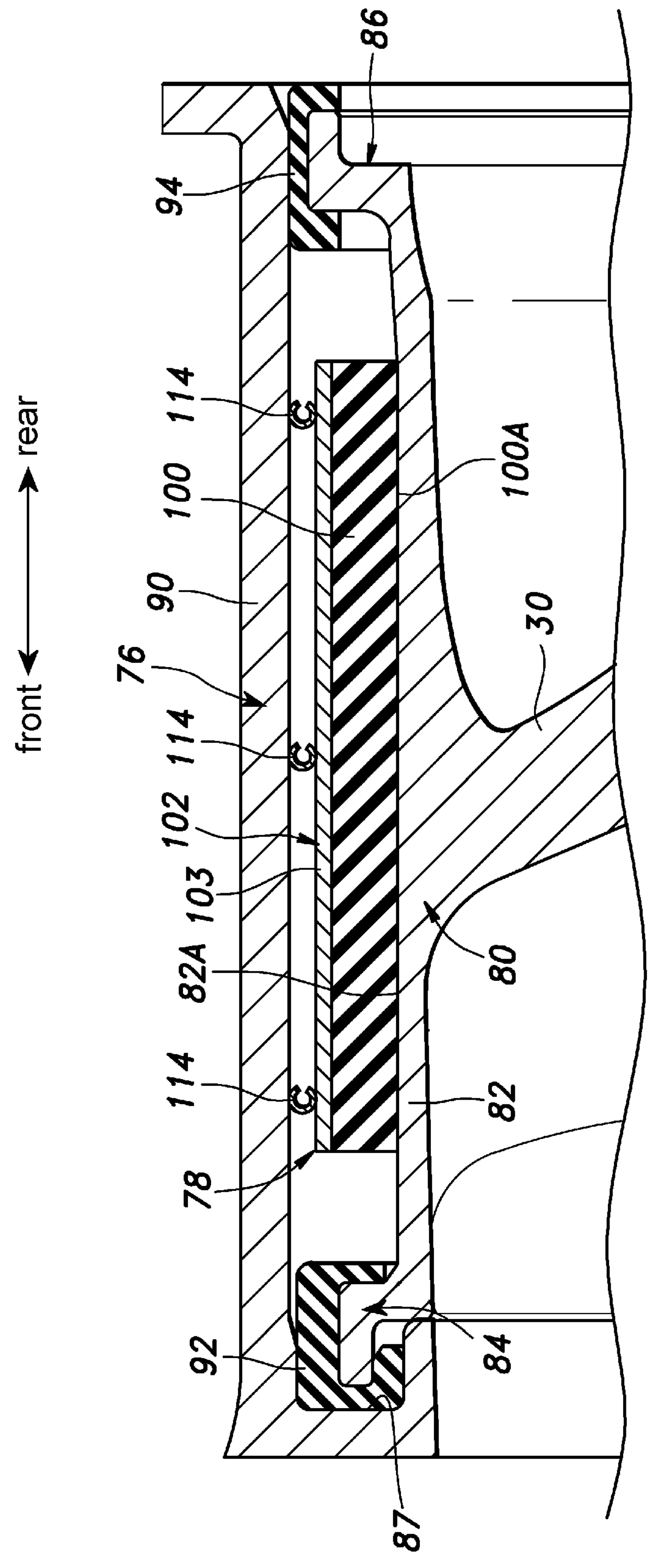
FIG. 5 is a view similar to FIG. 2 showing a vibration reduction device according to a third embodiment of the present invention.

A vibration reduction device 78 according to a third embodiment of the present invention will be described in the following with reference to FIG. 5. The parts shown in these drawings are denoted with like numerals to the corresponding parts shown in FIG. 1, and description of such parts may be omitted in the following description to avoid redundancy.

In the third embodiment, the preloading member 102 comprises a cylindrical member 103 that surrounds the elastomeric damping member 100, and a plurality of spring members 114 interposed between the inner circumferential surface of the housing member 90 and the outer circumferential surface of the cylindrical member 103. In the illustrated embodiment, there are three spring members 114 arranged at regular intervals in the axial direction. and each spring member 114 consists of a ring member having a C-shaped cross section. The open side of the spring member 114 (as seen in cross section) faces in the axial direction (rearward). The cross section of the spring member 114 in a free or unstressed state is substantially circular, and has a cross sectional outer diameter which, in an unstressed state, is slightly larger than the spacing between the outer circumferential surface of the cylindrical member 103 and the inner circumferential surface of the housing member 90. Therefore, when the spring members 114 are installed as shown in FIG. 5, the spring members 114 are compressed, and resiliently press the cylindrical member 103 radially inward in such a manner that the elastomeric damping member 100 is pressed radially compressed against the outer circumferential surface 82A of the cylindrical portion 82. As a result, the inner circumferential surface 100A of the elastomeric damping member 100 is pressed against the outer circumferential surface 82A of the cylindrical portion 82 with a certain preload. This preload can be freely adjusted by selecting the dimensions and the elastic modulus of the spring members 114.

In the third embodiment also, by applying a radially inward preload to the elastomeric damping member 100, the same actions and effects as those of the first embodiment can be obtained. In the second embodiment, installing of the preloading member 102 may be facilitated and the magnitude of the preload can be more accurately determined as compared with the first embodiment and the second embodiment. The third embodiment may be modified such that the spring members 114 are replaced by solid members 113 which may be circumferentially continuous in a ring form or may be segmented along the circumferential direction as shown in FIG. 2 in imaginary lines. These solid members 113 may also be integrally formed with the annular housing member 90. These solid members 113 are dimensioned in such a manner that a prescribed preloading is applied to the elastomeric damping member 100 when the annular base member 80 is assembled to the annular housing member 90. The reaction of the preload which the solid members 113 apply to the elastomeric damping member 100 via the cylindrical member 103 is supported by the annular housing member 90

The present invention has been described in terms of specific embodiments, but the present invention is not limited by such embodiments and can be modified in various ways without departing from the scope of the present invention. Moreover, not all of the constituent elements shown in the above embodiments are essential to the broad concept of the present invention, and they can be appropriately selected, omitted and substituted without departing from the gist of the present invention. For instance, the elastomeric damping member 100 may be segmented along the circumferential direction, instead of being a continuous ring entirely surrounding the cylindrical portion 82. The elastomeric damping member 100 is not required to be made of a single uniform layer, but may also include a plurality of layers for improved viscoelastic properties thereof. The spring members 114 are not limited to those shown in FIG. 5, but may also have a corrugated, wavy or any other shape so that a spring force may be generated by radially being radially compressed.

The vibration reducing device according to the present invention can also be applied to the stator vane row 40 of the axial-flow compressor 36 of the gas turbine engine 10, and the stator vane row 66 of the low-pressure turbine 62. Moreover, the vibration reduction device according to the present invention may be used for stationary blades of various other turbo machines other than gas turbine engines.

The contents of any cited references in this disclosure will be incorporated in the present application by reference.

The invention claimed is:

1. A turbo machine comprising rotor blades, stator vanes positioned behind the rotor blades, a vibration reduction device for the stator vanes, the vibration reduction device comprising:

an annular base member having a cylindrical shape concentric around a central axis of a casing of the turbo machine and supporting base ends of the stator vanes which extend radially inward from an inner circumferential surface of the base member;

an elastomeric damping member surrounding and in slidable contact with an outer circumferential surface of the base member; and a preloader surrounding an outer circumferential surface of the elastomeric damping member and configured to apply a preload directed radially inward to the elastomeric damping member, wherein the preloader includes a cylindrical member circumferentially surrounding the elastomeric damping member, and the preloader further includes a band member surrounding the cylindrical member, and a fastener configured to pull two ends of the band member toward each other and apply tension to the band member.

2. The turbo machine according to claim 1, wherein the elastomeric damping member consists of a tubular member which is whole along a circumferential direction.

3. The turbo machine according to claim 1, wherein the elastomeric damping member consists of a tubular member which is segmented along a circumferential direction.

4. The turbo machine according to claim 1, wherein the vibration reduction device further comprises an annular housing member that is supported by a casing of the turbo machine and coaxially surrounds the base member so as to define an annular chamber between an outer circumferential surface of the base member and an inner circumferential surface of the housing member, the housing member supporting a reaction of the preloader when a preload is applied to the elastomeric damping member by the preloader.

5. The turbo machine according to claim 4, wherein the vibration reduction device further comprises a spring member interposed between an outer circumferential surface of the preloader and the inner circumferential surface of the housing member.

6. The turbo machine according to claim 4, wherein the housing member is joined to the annular base member at both axial ends thereof via respective seal members.

* * * * *